United States Patent [19]

Savignac

[11] 4,218,496

[45] Aug. 19, 1980

[54] NATURAL STONE PANEL AND METHOD OF MAKING SAME

[76] Inventor: Manuel E. Savignac, P.O. Box 10475, El Paso, Tex. 79995

[21] Appl. No.: 945,319

[22] Filed: Sep. 25, 1978

[30] Foreign Application Priority Data

Mar. 16, 1978 [MX] Mexico .................................. 172784

[51] Int. Cl.² .......................... B05D 5/00; B05D 1/36; B44F 9/04; B32B 3/16
[52] U.S. Cl. .................................. 427/263; 427/281; 52/309.17; 428/15; 428/45; 428/46
[58] Field of Search ....................... 428/15, 45, 46, 49, 428/50; 156/71, 153, 154; 52/309.17, 388; 427/263, 281

[56] References Cited

U.S. PATENT DOCUMENTS

| | | | |
|---|---|---|---|
| 2,931,751 | 4/1960 | Du Fresne | 428/49 |
| 3,097,080 | 7/1963 | Weir | 428/15 |
| 3,341,396 | 9/1967 | Iverson | 428/15 |
| 3,396,067 | 8/1968 | Schafer | 428/15 |
| 3,560,315 | 2/1971 | Evans et al. | 428/50 |
| 3,700,534 | 10/1972 | Cook | 428/46 |
| 3,878,030 | 4/1975 | Cook | 428/45 |
| 3,884,737 | 5/1975 | Bransford, Jr. | 428/45 |

Primary Examiner—George F. Lesmes
Assistant Examiner—Daniel R. Zirker
Attorney, Agent, or Firm—Clarence A. O'Brien; Harvey B. Jacobson

[57] ABSTRACT

A natural stone panel is constructed from rectangular sheets, slabs or blocks of natural stone, particularly marble or onyx and constructed by placing an array of rectangular stone blocks on a work surface, placing a fiberglass backing on the upper surface of the array, applying an adhesive, which can have a stone dust filler, to the joints between adjacent blocks, on the blocks and on the fiberglass backing, which is rolled into contact with the blocks. After hardening or curing of the adhesive, the exposed stone block surfaces can be polished, an overlay of clear plastic applied to the surface of the stone blocks, and the panel edges trimmed with a suitable cutting tool. The panels formed can be wall mounted by a suitable adhesive bonding the fiberglass backing to the wall surface, or alternatively, the panels can be adhesive bonded to a floor surface.

7 Claims, 7 Drawing Figures

NATURAL STONE PANEL AND METHOD OF MAKING SAME

BACKGROUND OF THE INVENTION

1. Field of the Invention

The invention relates to a panel and a method for making a decorative panel structure, more particularly to wall or floor mounted panels made of blocks or slabs, specifically rectangular blocks, of natural stone bonded together and to a fiberglass backing. Panels are mounted with an adhesive upon a vertical or horizontal surface, and application of a clear polyester overlay gives gloss and durability to the visible stone surface.

2. Description of the Prior Art

Laminated structures including a backing member and pieces of ceramic, stone chips, marble or the like bonded thereto are known. Also known in the prior art is use of a fiberglass fabric as a backing member for certain applications. Provision of a clear polyester overlay is also known. The following U.S. Pat. Nos. are illustrative of certain features in the prior art: 1,976,986—Oct. 16, 1934—Desagnat, 2,931,751—Apr. 5, 1960—DuFresne, 3,560,315—Feb. 2, 1971—Evans et al., 3,700,534—Oct. 24, 1972—Cook, 3,878,030—Apr. 15, 1975—Cook.

SUMMARY OF THE INVENTION

It is an object of the present invention to provide a decorative wall or floor panel which can display a variety of patterns chosen by selection and arrangement of stone blocks bonded to fiberglass backing having strength sufficient to permit handling in manufacture, shipment and mounting.

It is a further object to disclose a process for making such a panel.

Another object of the invention is to provide a natural stone block panel and a method of making it which utilizes epoxy or polyester resin, dried with stone powder or dust, to bond the stone blocks to a fiber glass backing and to fill voids between adjacent blocks.

Still another object of the invention is to provide a natural stone decorative panel appearing as one single piece of stone, but comprising a plurality of blocks of stone bonded to a fiberglass backing and subsequently polished to give the appearance of a single block of polished stone.

Yet another feature of the invention is providing of a fire-resistant interior construction material which is stable with respect to discoloration or ignition below 550 degrees Fahrenheit.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
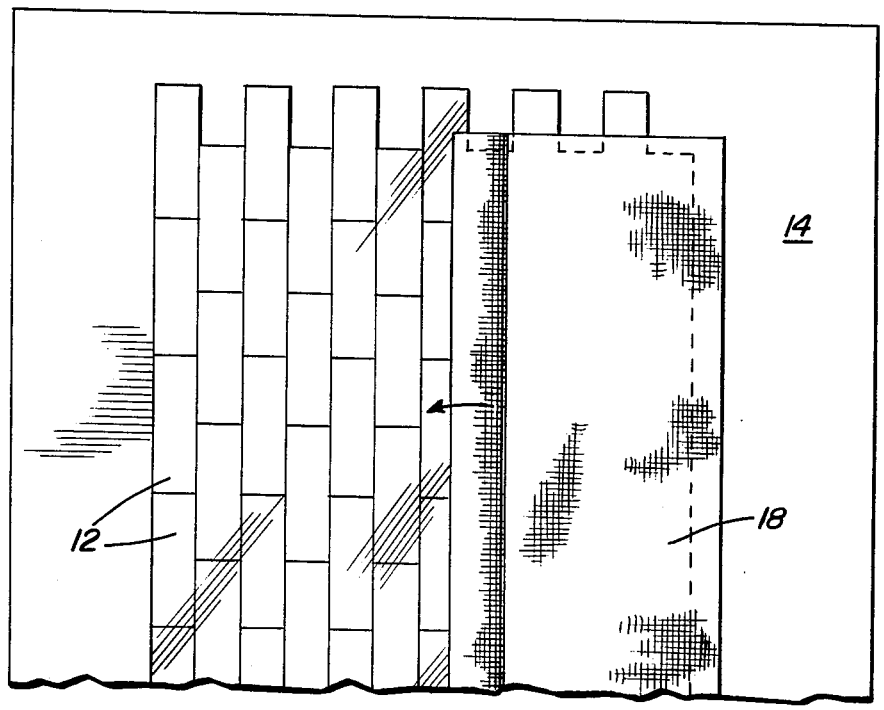
FIG. 1 is a top plan view of an assembly area utilized in manufacture of the panels of the present invention.
Figure 5:
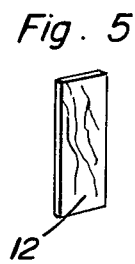
FIG. 5 is a perspective view of one stone block used in making the panel of the present invention.
Figure 4:
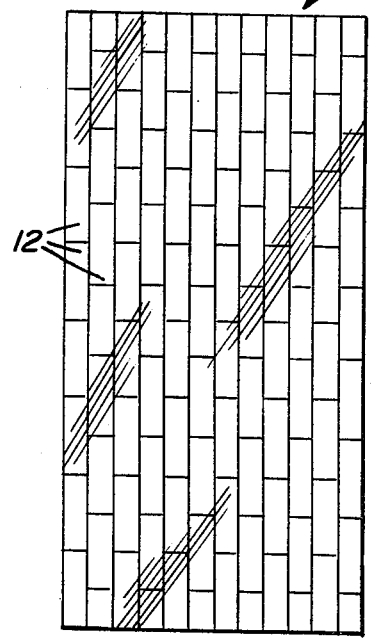
FIG. 4 is a plan view of a panel in its finished form.
Figure 2:
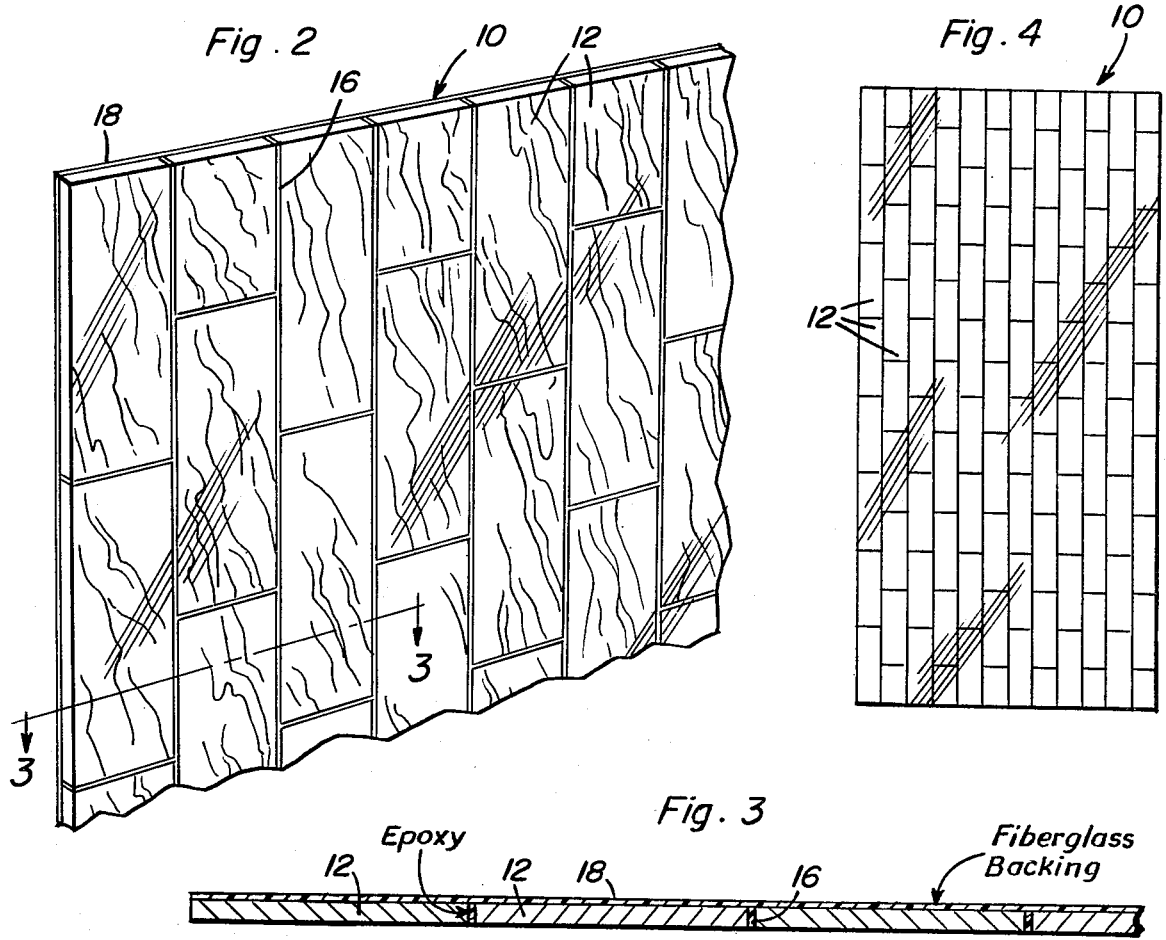
FIG. 2 is a fragmental perspective view of a corner portion of a finished panel.
Figure 3:
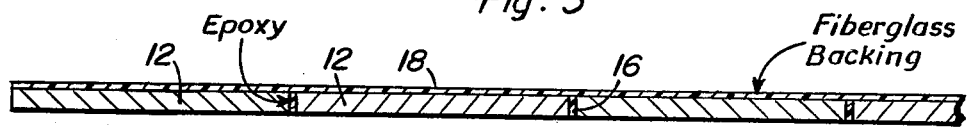
FIG. 3 is a fragmental sectional view taken substantially upon a plane passing along section line 3—3 of FIG. 2.

Referring now specifically to the drawings, FIGS. 2-4 illustrate a panel 10 resulting from the process of assembling a plurality of rectangularly shaped, relatively thin blocks, slabs or sheets 12 of natural stone, such as marble or onyx, which have been cut to a predetermined size. FIG. 1 illustrates a portion of the process of assembling the blocks 12 into a panel 10.

Each block 12 used in forming a panel 10 is of identical shape and size which may vary but preferably is 4 inches long, 12 inches wide and ⅜ inch thick with opposed edges being parallel and opposed surfaces being parallel and planar, with it being pointed out that the surfaces and edges may vary slightly due to inaccuracies which occur when cutting the blocks from a large block of marble or onyx. In selecting the blocks to be used in forming a panel, they may be arranged so that adjacent blocks will be substantially identical in appearance or the blocks may be arranged to form a mosaic pattern or the like. Also, the blocks 12 are arranged in longitudinal rows with the end joints between adjacent blocks being disposed in staggered relationship as illustrated in FIGS. 2 and 4.

When assembling the blocks 12 to form the panel 10, the blocks 12 are positioned on a work surface such as a substantially flat, planar surface 14 of a workbench or the like with the blocks 12 being positioned manually thereon in the manner illustrated in FIG. 1 with the edges of the adjacent blocks 12 being in contact with each other or as close as possible while maintaining parallelism of the longitudinal rows of blocks 12.

The blocks 12 are bonded together by utilizing a bonding agent such as epoxy 16 or polyester resin either of which is utilized with a known catalyst, such as methyl ethyl ketone peroxide, and which may be combined with marble or onyx dust to dry the epoxy or polyester resin and fill the voids to give the panel or end product a great strength and a monolithic appearance. The blocks 12 are provided with a backing sheet in the form of a fabric member 18 of fiberglass or the like which is applied to the upper surface of the blocks 12 which have been placed on the workbench surface 14 prior to hardening or setting of the bonding agent with FIG. 1 illustrating the manner in which the backing layer is rolled onto the surface of the blocks 12 so that after curing, the entire panel assembly which forms a rigid unit may be lifted from the workbench surface 14 which, of course, was provided with a release agent, such as a wax coating, vinyl plastic sheeting, or the like, which enables the hardened resin to be separated from the workbench surface 14. The variations in the thickness and other dimensional characteristics of the blocks 12 will be compensated for by the thickness of the resin material and the backing sheet so that the downwardly facing surface of the blocks 12 will be substantially in flat planar aligned relation since they were resting on a flat surface when secured together. The marble or onyx dust which is used depending upon which type of natural stone the block 12 is cut from provides a continuity of the natural stone surface across the joints between adjacent blocks so that the panel 10 will have the appearance of being a single piece or monolithic slab.

The panel when removed from the workbench may be cut to any desired module size, but normally, the end edges are the only edges which need to be cut. The finished panel 10 may be cut to any dimensions desired, such as standard sized modules four feet by four feet, four feet by eight feet, and the like, or any other suitable size within the limits of the size of the workbench surface 14. The cutting operation of the panel may be accomplished by an electrically powered portable hand saw having a "Carborundum" blade or by any other suitable type of saw or cutting implement having a suitably hardened cutting edge, thus enabling the panel to be cut, drilled, beveled or otherwise "worked" with conventional tools utilized in conjunction with natural stone. The front surface of the panel 10 may be smoothed and polished using rotatable abrasive disks or oscillating abrasive pads and the like to polish the surface to a high gloss and, if desired, a clear protective coating, such as clear polyester resin, or the like, may be applied to the panel 10.

As indicated, the blocks 12 may vary in dimension especially as to their width and length and the panels may vary as to their length and width depending upon the use of such panels as floor panels, wall panels, counter tops, building facings, and many other uses for which building panels are adapted. For example, in panelling the two end and the rear wall of a bathtub enclosure in which the end walls are 30 inches wide and 54 inches high and the rear wall is 60 inches long and 54 inches high, which are standard measurements for bathtub enclosures, two panels 54 inches long and 60 inches wide may be employed, with one of the panels being divided longitudinally, thus providing two panels 54 inches long by 30 inches wide for the two end walls and a single panel 54 inches long and 60 inches wide for the rear wall. The panels may be installed by using conventional mastic type materials utilized for building panels or suitable brackets may be attached to the inner surface of the panels by a bonding agent, such as epoxy resin or polyester resin. Any other type of attaching means conventionally employed to secure building panels may be utilized to secure the panels 10 in assembled relation on a wall, floor, or wherever they are to be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method for making a decorative natural stone panel from blocks of natural stone, fiberglass backing, and an adhesive including dust formed from the same stone material as forms said blocks, a curing agent, and a resin, the method comprising the steps of arranging on a horizontal work surface an array of said blocks of natural stone, placing a roll of said fiberglass backing along one edge of said array, forming said adhesive by combining said dust, said curing agent and said resin, unrolling said roll and simultaneously applying said adhesive to the space between said blocks to the upper surface of said roll, smoothing said fiberglass backing upon said blocks, curing the adhesive to form a hardened resin and a rigid unit having end edges, lifting the rigid unit from said work surface, and subsequently polishing the exposed surface of said blocks to a high gloss, and applying to said polished blocks a protective coating.

2. The method of claim 1 wherein said blocks of natural stone are blocks of marble, and said dust is marble dust.

3. The method of claim 1 wherein said blocks of natural stone are blocks of onyx and said dust is onyx dust.

4. The method of claim 1 wherein the method includes after the lifting step and before the polishing step the step of cutting said end edges to form a standard sized module, and wherein said adhesive is formed by combining said dust with a methyl ethyl ketone curing agent and a resin selected from the group consisting of epoxy and polyester resins, whereby said panel is fire-resistant and stable with respect to discoloration or ignition below about 550° F.

5. The method of claim 4 wherein said resin is a polyester resin.

6. The method of claim 1 wherein said protective coating is formed by applying a clear polyester resin to the polished blocks.

7. The method of claim 6 together with the additional step of cutting said polished blocks into panels having dimensions of about 30 inches by 54 inches.

* * * * *